(12) United States Patent
Ito et al.

(10) Patent No.: US 10,095,156 B2
(45) Date of Patent: Oct. 9, 2018

(54) CONDUCTIVE FOAM ROLL

(71) Applicant: SUMITOMO RIKO COMPANY LIMITED, Komaki-shi, Aichi (JP)

(72) Inventors: Kunio Ito, Komaki (JP); Satoshi Suzuki, Komaki (JP); Masanari Umeda, Komaki (JP); Motoharu Ishihara, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 113 days.

(21) Appl. No.: 15/240,506

(22) Filed: Aug. 18, 2016

(65) Prior Publication Data

US 2017/0075253 A1 Mar. 16, 2017

Related U.S. Application Data

(63) Continuation of application No. PCT/JP2015/074205, filed on Aug. 27, 2015.

(30) Foreign Application Priority Data

Aug. 28, 2014 (JP) ................................ 2014-174329

(51) Int. Cl.
*G03G 15/08* (2006.01)
*F16C 13/00* (2006.01)
(Continued)

(52) U.S. Cl.
CPC ........... *G03G 15/0808* (2013.01); *B32B 5/18* (2013.01); *C08G 18/14* (2013.01); *C08G 18/1833* (2013.01); *C08G 18/2081* (2013.01); *C08G 18/48* (2013.01); *C08G 18/4837* (2013.01); *C08G 18/7607* (2013.01);
(Continued)

(58) Field of Classification Search
CPC . G03G 15/0808; C08J 9/0014; C08J 2205/05; C08K 5/0075; B32B 5/18; B32B 2307/202
See application file for complete search history.

(56) References Cited

U.S. PATENT DOCUMENTS

2005/0202946 A1 9/2005 Hattori et al.
2012/0288306 A1 11/2012 Ikegami et al.

FOREIGN PATENT DOCUMENTS

JP 2004-17398 A 1/2004
JP 2005-254519 A 9/2005
(Continued)

OTHER PUBLICATIONS

International Searh Report dated Oct. 27, 2015, issued in counterpart International Application No. PCT/JP2015/074205 (2 pages).

*Primary Examiner* — Hai Vo
(74) *Attorney, Agent, or Firm* — Westerman, Hattori, Daniels & Adrian, LLP (57) ABSTRACT

Provided is a conductive foam roll having a high surface opening ratio that achieves both cleaning performance and low resistance. A conductive foam roll 10 includes a shaft body 12 and a conductive foam layer 14 around the shaft body 12, wherein the conductive foam layer 14 has a surface opening ratio of 50% to 90%, and wherein the conductive foam layer 14 contains an ionic conductive agent that contains salt of diallyl-type ammonium cations, and at least one selected from the group consisting of N,N-bis(trifluoromethanesulfonyl)imide anions, and N,N-bis(fluorosulfonyl)imide anions.

9 Claims, 8 Drawing Sheets (51) Int. Cl.
    *C08G 18/76*     (2006.01)
    *C08G 18/08*     (2006.01)
    *C08G 18/48*     (2006.01)
    *B32B 5/18*     (2006.01)
    *C08J 9/00*     (2006.01)
    *G03G 15/00*     (2006.01)
    *C08G 18/18*     (2006.01)
    *C08G 18/20*     (2006.01)
    *C08K 5/19*     (2006.01)
    *C08K 5/435*     (2006.01)
    *C08G 101/00*     (2006.01)

(52) U.S. Cl.
    CPC ..... *C08G 18/7621* (2013.01); *C08G 18/7664* (2013.01); *C08J 9/0014* (2013.01); *C08J 9/0019* (2013.01); *C08J 9/0023* (2013.01); *C08J 9/0028* (2013.01); *C08J 9/0033* (2013.01); *C08K 5/19* (2013.01); *C08K 5/435* (2013.01); *F16C 13/00* (2013.01); *G03G 15/00* (2013.01); *G03G 15/08* (2013.01); *B32B 2307/202* (2013.01); *C08G 2101/0083* (2013.01); *C08J 2201/022* (2013.01); *C08J 2205/05* (2013.01); *C08J 2205/052* (2013.01); *C08J 2205/06* (2013.01); *C08J 2207/00* (2013.01); *C08J 2375/08* (2013.01)

(56) References Cited

FOREIGN PATENT DOCUMENTS

| | | |
|---|---|---|
| JP | 2009-48067 A | 3/2009 |
| JP | 2012-47871 A | 3/2012 |
| JP | 2014-65811 A | 4/2014 |

CONDUCTIVE FOAM ROLL

TECHNICAL FIELD

The present invention relates to a conductive foam roll, more specifically relates to a conductive foam roll suitably used for a toner supply roll of an electrophotographic machine such as a copying machine, a printer, and a facsimile machine.

BACKGROUND ART

A toner supply roll of an electrophotographic machine supplies toner to a developing roll and cleans the developing roll (scrapes to collect the remaining toner). In order to improve the toner carrying performance and the cleaning performance, the toner supply roll is made of a foam (sponge). The foam includes on its surface a plurality of recesses made by opened foam cells, and cell walls defining the surface recesses. Conventionally, the toner is carried by physically being stored in the surface recesses, and cleaning was performed by scraping the remaining toner by the cell walls. In recent years, in addition to physically carrying and cleaning the toner, it is considered to carry and clean the toner by using an electric attractive force by imparting conductivity to the foam to apply a voltage to the foam.

For example, Patent Document 1 is known as the conductive foam roll. Patent Document 1 describes adding an ionic conductive agent to a conductive foam layer.

CITATION LIST

Patent Literature

Patent Document 1: Patent JP 2005-254519

SUMMARY OF INVENTION

Problems to be Solved by the Invention

In order that the toner supply roll has cleaning performance more improved than a conventional toner supply roll, it is necessary to increase the ratio of surface openings made by the foam cells to increase the number of cell walls that appear on the surface. However, increasing the surface opening ratio reduces the area of a portion of the toner supply roll that is brought into contact with the developing roll, so that the toner supply roll has high resistance. Thus, it is difficult that the conductive foam roll having a high surface opening ratio achieves both cleaning performance and low resistance.

The present invention is made in view of the problem described above, and an object of the present invention is to provide a conductive foam roll having a high surface opening ratio that achieves both cleaning performance and low resistance.

Solution to Problem

To achieve the objects and in accordance with the purpose of the present invention, the conductive foam roll according to the present invention includes a shaft body, and a conductive foam layer around the shaft body, wherein the conductive foam layer has a surface opening ratio of 50% to 90%, and wherein the conductive foam layer contains an ionic conductive agent, and the ionic conductive agent contains salt of diallyl-type ammonium cations, and at least one selected from the group consisting of N,N-bis(trifluoromethanesulfonyl)imide anions, and N,N-bis(fluorosulfonyl)imide anions.

In this case, it is preferable that the anions in the ionic conductive agent should be N,N-bis(fluorosulfonyl)imide anions. It is preferable that the cations in the ionic conductive agent should be diallyldimethylammonium cations.

Advantageous Effects of Invention

According to the conductive foam roll according to the present invention, since in the conductive foam layer having the surface opening ratio of 50% to 90%, the conductive foam layer contains the ionic conductive agent, and the ionic conductive agent contains the specific ammonium salt, the conductive foam roll can exhibit high cleaning performance while securing low resistance.

When the anions in the ionic conductive agent define N,N-bis(fluorosulfonyl)imide anions, the conductive foam roll is made low resistant more effectively. Further, when the cations in the ionic conductive agent define diallyldimethylammonium cations, the conductive foam roll is made low resistant more effectively.

BRIEF DESCRIPTION OF DRAWINGS

FIGS. 3A and 3B are schematic diagrams of conductive foam layers showing their surfaces of given ranges, where FIG. 3A shows a conductive foam layer having a high surface opening ratio and FIG. 3B shows a conductive foam layer having a low surface opening ratio.

FIGS. 4A and 4B are schematic diagrams for explaining the cleaning performance between different surface opening ratios, where FIG. 4A shows the conductive foam layer having a high surface opening ratio and FIG. 4B shows the conductive foam layer having a low surface opening ratio.

FIGS. 5A and 5B are schematic diagrams for explaining the conductivity between different surface opening ratios, where FIG. 5A shows the conductive foam layer having a high surface opening ratio and FIG. 5B shows the conductive foam layer having a low surface opening ratio.

DESCRIPTION OF EMBODIMENTS

Hereinafter, specific descriptions of a preferred embodiment of the present invention will be provided with reference to the drawings.

Figure 1A:
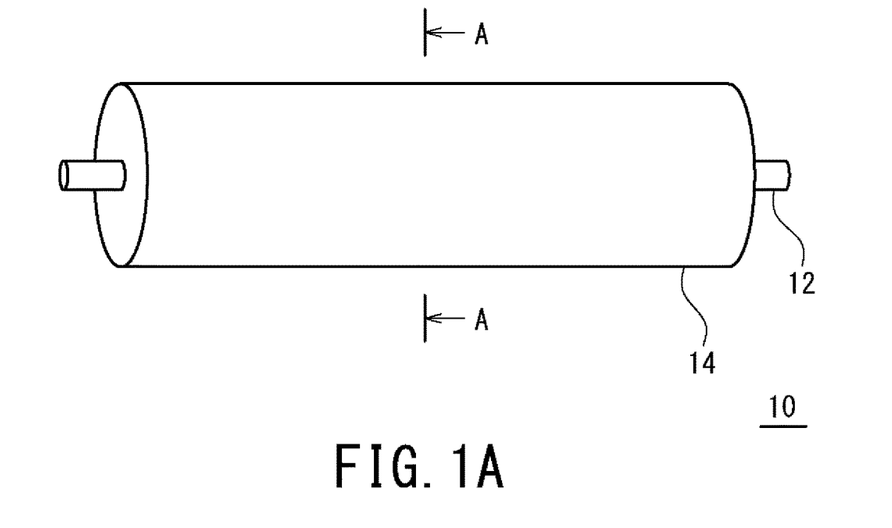
FIG. 1A is an external perspective view of a conductive foam roll according to one embodiment of the present invention.
Figure 1B:
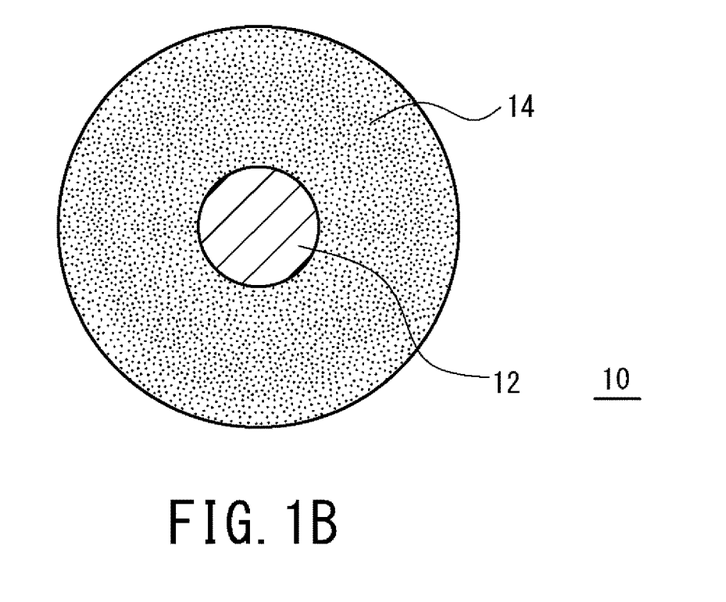
FIG. 1B is a circumferential cross-sectional view of the conductive foam roll (a cross-sectional view taken along the line A-A of FIG. 1A).
Figure 2A:
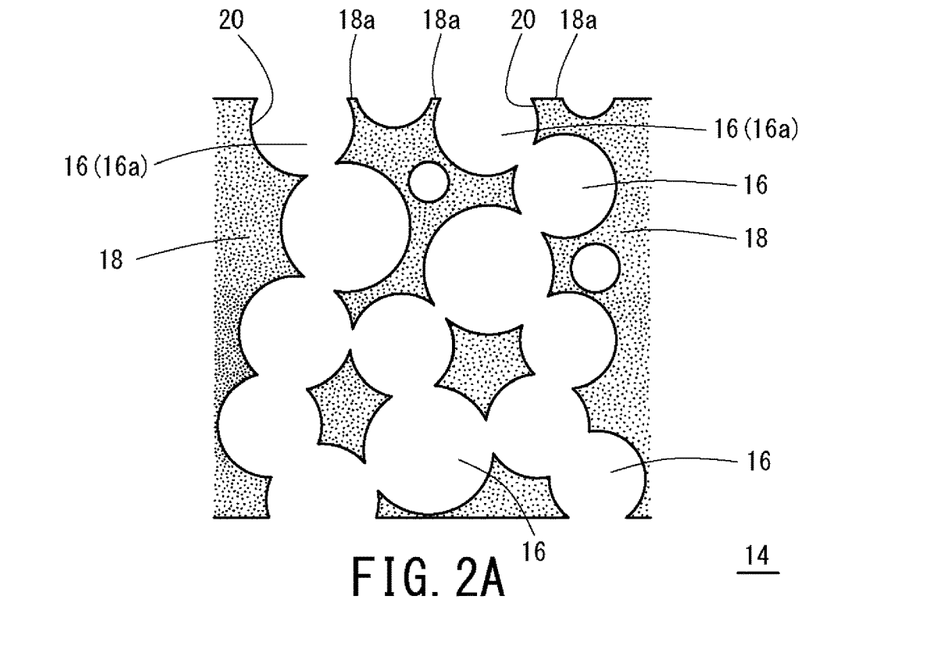
FIG. 2A is an enlarged cross-sectional view of a conductive foam layer showing a portion close to a surface of the conductive foam layer, where a large number of cells are in communication with each other in the thickness direction.
Figure 2B:
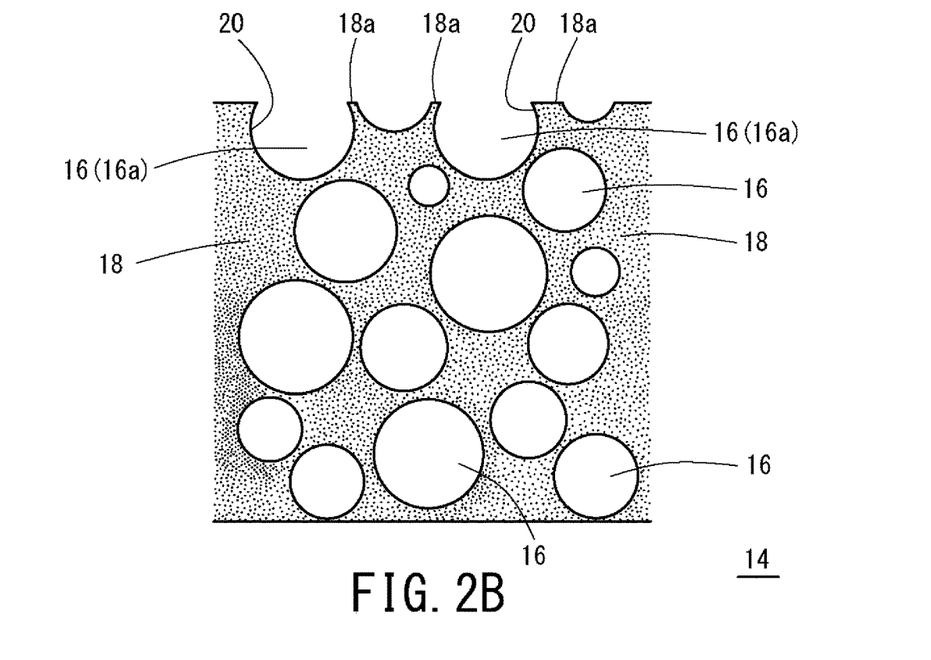
FIG. 2B is an enlarged cross-sectional view of the conductive foam layer showing a portion close to the surface of the conductive foam layer, where a large number of cells are not in communication with each other in the thickness direction.

In FIG. 1, a conductive foam roll according to one embodiment of the present invention is shown. As shown in FIG. 1, a conductive foam roll 10 includes a shaft body 12 and a conductive foam layer 14 around the shaft body 12. FIG. 2 are enlarged views of the conductive foam layer 14 showing a portion close to a surface of the conductive foam layer 14. As shown in FIGS. 2A and 2B, the conductive foam layer 14 consists of a large number of cells (gas phase) 16 and cell walls (resin phase) 18 that define the cells 16. The cells (gas phase) 16 and the cell walls (resin phase) 18 are distributed throughout the conductive foam layer 14 in the circumferential direction and in the thickness direction. Including the large number of cells 16, the conductive foam layer 14 is more excellent in flexibility than a solid resin layer including no cells (no gas phase). The large number of cells 16 may be in communication with each other (may be open-celled) in the thickness direction as shown in FIG. 2A, or may not be in communication with each other (may be closed-celled) in the thickness direction as shown in FIG. 2B. In order to have open-celled cells, methods for increasing the foaming ratio, adding a foam breaker, removing the cell walls 18 by blowing compressed gas or hot air thereto in closed-celled cells, and the like may be used. In order to have closed-celled cells, methods for decreasing the foaming ratio, selecting a foam stabilizer, and the like may be used.

As shown in FIG. 2, the conductive foam layer 14 includes, on its surface, a plurality of recesses 20 that are made by opened cells 16a close to the surface. Surface cell walls 18a that define the recesses 20 exist between the adjacent recesses 20. The recesses 20 define portions arranged to store toner. The toner is carried (supplied and removed) with the use of these recesses 20. The surface cell walls 18a define portions arranged to physically scrape the toner that is brought into contact with to remain on the surface of a developing roll. The toner scraped from the surface of the developing roll is stored in the recesses 20 close to the surface cell walls 18a. Cleaning is performed with the use of the surface cell walls 18a and the recesses 20. In addition, the surface cell walls 18a define portions arranged to be brought into contact with the surface of the developing roll, and thus the conductive foam layer 14 is made to have continuity with the developing roll with the use of the surface cell walls 18a.

When the large number of cells 16 are in communication with each other in the thickness direction as shown in FIG. 2A, the portion to store the toner expands in the thickness direction to increase the amount of toner to be stored, so that the amount of the toner to be carried and the amount of the toner to be scraped are increased. In addition, the cells 16 can be prevented from being clogged with the toner.

In the conductive foam roll 10, the surface opening ratio of the conductive foam layer 14 is from 50% to 90%. The surface opening ratio of the conductive foam layer 14 can be found by performing digitized image analysis on a picture of the surface of the conductive foam layer 14 that is picked up with the use of an optical microscope. The surface opening ratio of the conductive foam layer 14 can be found based on the area ratio of the gas phase and the resin phase that appear on the surface of the conductive foam layer 14. The surface opening ratio of the conductive foam layer 14 can be expressed as the opening ratio in a predetermined range (3.2 mm×2.4 mm) where a large number of cells on the surface of the conductive foam layer 14 are contained. The average opening diameter in the surface of the conductive foam layer 14 is within the range of 50 to 500 μm.

Figure 3A:
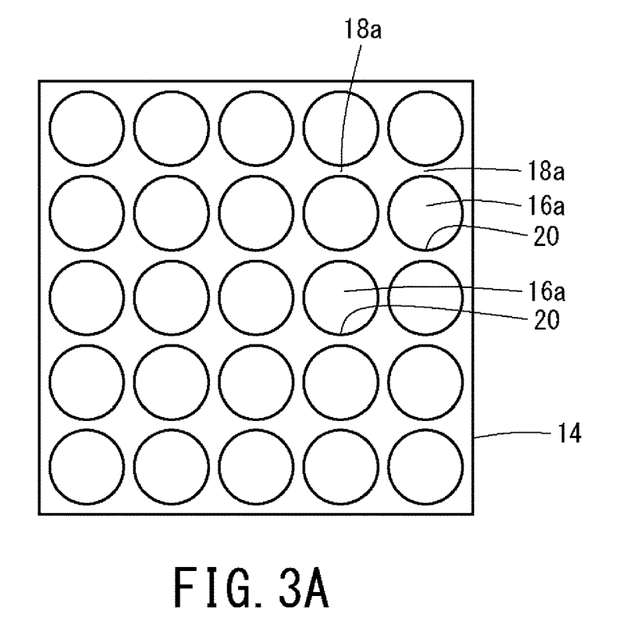
Figure 3B:
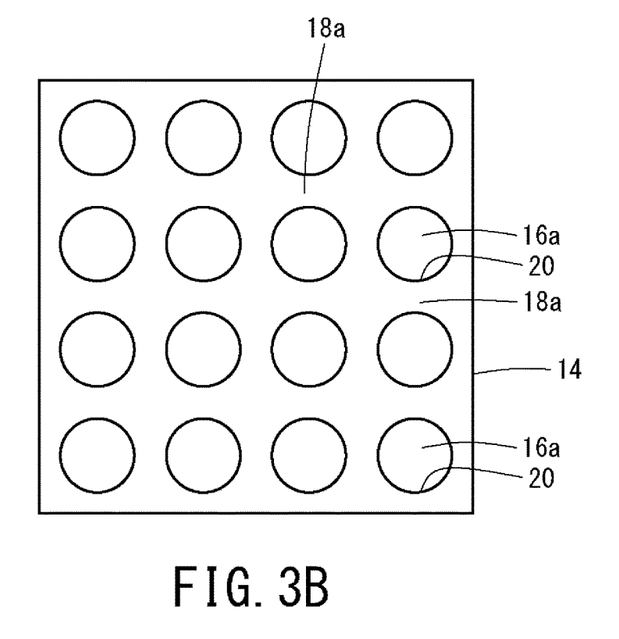
Figure 4A:
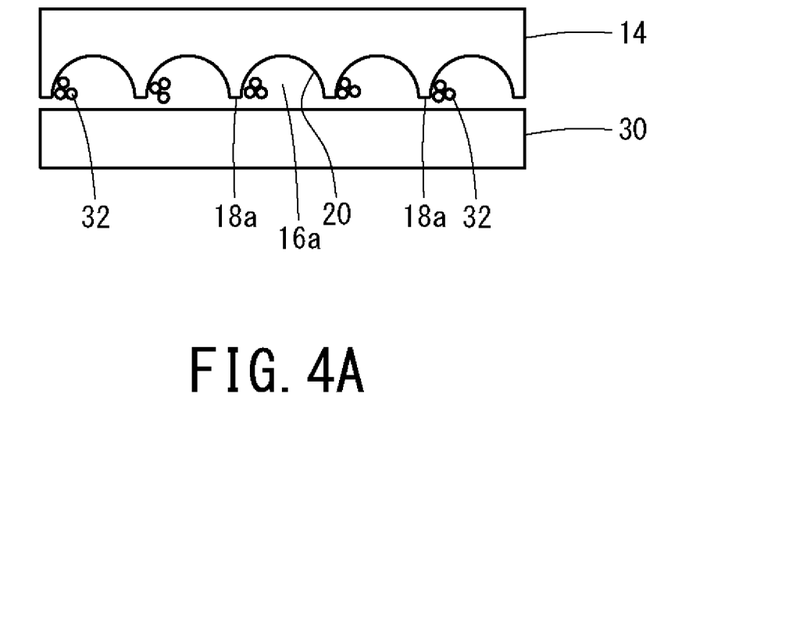
Figure 4B:
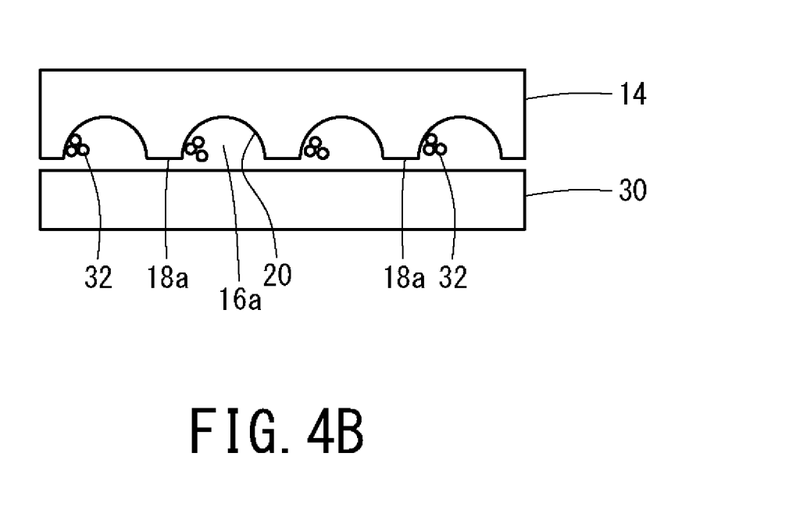
Figure 5A:
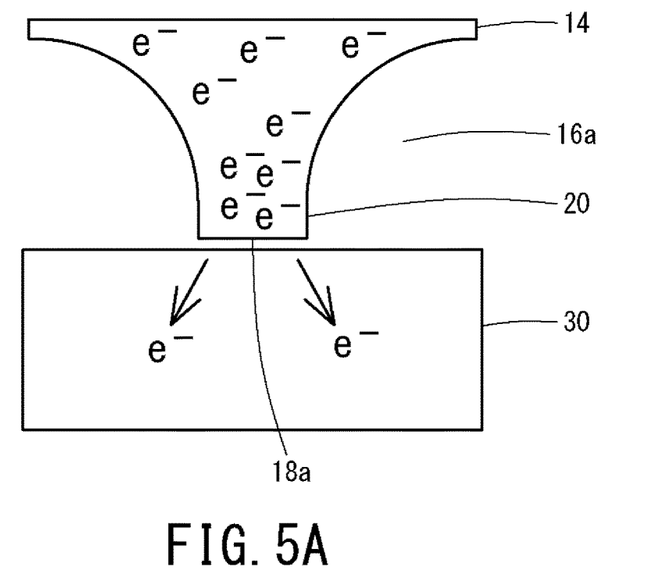
Figure 5B:
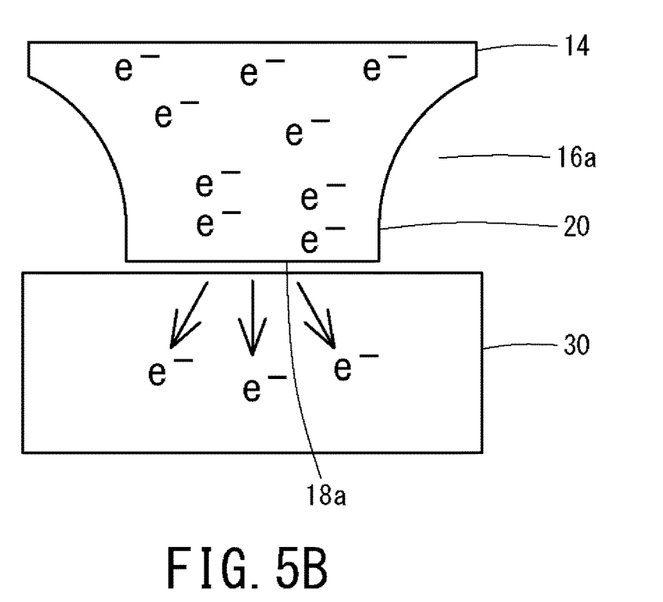

In FIGS. 3A and 3B, the predetermined range in the surface of the conductive foam layer 14 is shown in a schematic form. FIGS. 4A and 4B are schematic diagrams for explaining the cleaning performance between different surface opening ratios. FIGS. 5A and 5B are schematic diagrams for explaining the conductivity between different surface opening ratios. The configurations shown in FIGS. 4A and 5A correspond to the configuration shown in FIG. 3A. The configurations shown in FIGS. 4B and 5B correspond to the configuration shown in FIG. 3B.

When the surface opening ratio of the conductive foam layer 14 is high, the number of surface cell walls 18a in the predetermined range is large as shown in FIG. 3A, and the portions arranged to physically scrape toner 32 that is brought into contact with to remain on the surface of a developing roll 30 are increased as shown in FIG. 4A to improve the cleaning performance. On the other hand, when the surface opening ratio of the conductive foam layer 14 is low, the number of surface cell walls 18a in the predetermined range is small as shown in FIG. 3B, and the portions arranged to physically scrape toner 32 that is brought into contact with to remain on the surface of a developing roll 30 are decreased as shown in FIG. 4B to lower the cleaning performance. From the viewpoint of exhibiting high cleaning performance, the surface opening ratio of the conductive foam layer 14 is 50% or more. In addition, from this viewpoint, the surface opening ratio of the conductive foam layer 14 is preferably 55% or more, and more preferably 60% or more.

However, when the surface opening ratio of the conductive foam layer 14 is high, the contact area of the surface cell walls 18a in contact with the surface of the developing roll 30 in the predetermined range is small as shown in FIG. 3A. Thus, ions concentrate in the surface cell walls 18a as shown in FIG. 5A, and the conductive foam layer 14 has higher resistance than the conductive foam layer 14 that has a low surface opening ratio shown in FIG. 3B. When the surface opening ratio of the conductive foam layer 14 is low, the contact area of the surface cell walls 18a in contact with the surface of the developing roll 30 in the predetermined range is large as shown in FIG. 3B. Thus, ions do not concentrate in the surface cell walls 18a as shown in FIG. 5B, and the conductive foam layer 14 has low resistance. The range in the conductive foam layer 14 where the surface opening ratio is 50% or more can exhibit high cleaning performance; however, ions concentrate in the surface cell walls 18a because the surface opening ratio is high. Thus, a specific ionic conductive agent is used in order to secure conductivity even when the conductive foam layer has a high surface opening ratio.

However, when the surface opening ratio of the conductive foam layer 14 is too high, necessary conductivity cannot be secured even with the use of a specific ionic conductive agent. Thus, from the viewpoint of securing conductivity, the surface opening ratio of the conductive foam layer 14 is 90% or less. In addition, from this viewpoint, the surface opening ratio of the conductive foam layer 14 is preferably 85% or less, and more preferably 80% or less.

The conductive foam layer 14 contains an ionic conductive agent. The ionic conductive agent defines a specific ionic conductive agent containing salt of diallyl-type ammonium cations, and at least one selected from the group consisting of N,N-bis(trifluoromethanesulfonyl)imide anions (TFSI), and N,N-bis(fluorosulfonyl)imide anions (TSI).

The anions in the ionic conductive agent contain the electron-attracting fluorine atoms. The negative charges are delocalized in the anions by the electron-attracting groups. Thus, electrostatic interaction with the cations is lowered, and the ions are easily dissociated.

In addition, as shown in Table 1, the above-described TFSI and FSI have relatively small molecular masses among anions containing fluorine atoms. Thus, the anion concentrations in the above-described TFSI and FSI are more increased with respect to the same additive mass than the anion concentrations in the other anions containing fluorine atoms, so that the anion mass can be more increased with respect to the same additive mass. By increasing the anion mass in this manner, the conductivity can be secured even when the ions concentrate. From the viewpoint of increasing the anion mass based on the difference between molecular masses of the anions, the FSI that has a smaller molecular mass is preferred between the TFSI and the FSI.

TABLE 1

| | Molecular Structure | Molecular Mass |
|---|---|---|
| TF | $CF_3-S(=O)_2-O^-$ | 149 |
| FSI | $(F-S(=O)_2)_2N^-$ | 180 |
| TFSI | $(CF_3-S(=O)_2)_2N^-$ | 280 |
| <C2F5> | $(CF_3CF_2-S(=O)_2)_2N^-$ | 380 |
| <C3F7> | $(CF_3CF_2CF_2-S(=O)_2)_2N^-$ | 480 |
| <C4F9> | $(CF_3CF_2CF_2CF_2-S(=O)_2)_2N^-$ | 580 |

N,N-bis(pentafluoroethanesulfonyl)imide anions <$C_2F_5$>, N,N-bis(heptafluoropropanesulfonyl)imide anions <$C_3F_7$>, and N,N-bis(nonafluorobutanesulfonyl)imide anions <$C_4F_9$> that define fluorine anions having a larger molecular mass than the TESI have a large molecular mass as shown in Table 1, and they cannot contribute to improvement in conductivity. Meanwhile, trifluoromethanesulfonate anions (TF) that define fluorine anions having a smaller molecular mass than the FSI has a small molecular mass as shown in Table 1, so that the surface charge density of the TF is increased to enhance the electrostatic interaction with the cations, and the ions are not easily dissociated. For this reason, the TF cannot contribute to improvement in conductivity. The TFSI and FSI are excellent in balance between the effect of increasing the anion mass and the ease of ionic dissociation to thus contribute to the improvement in conductivity.

Each of the cations of the ionic conductive agent has two allyl groups bonded to an N atom. These types of ammonium cations define diallyl-type cations, and each of them has two alkyl groups in addition to the two allyl groups. Alkyl groups having 1 to 8 carbon atoms are preferred as the two alkyl groups. The two alkyl groups may be of the same type or may be of different types. The allyl groups define electron attracting groups by which the negative charges are delocalized in the cations. Thus, electrostatic interaction with the anions is lowered, and the ions are easily dissociated. In the conductive foam layer 14, the allyl groups of the cations in the ionic conductive agent are present as allyl groups, and are not polymerized, for example, by a radical generating agent such as sulfur and a peroxide.

Diallyl-type ammonium cations form a bond with matrix prepolymer having an unsaturated bond to be immobilized in matrix polymer in the presence of a radical generating agent. At this time, the diallyl-type ammonium cations are polymerized. Once polymerized, the diallyl-type ammonium cations have their charge densities on the N increased, and thus have their relative dielectric constants increased. The charge is in the direction of being localized, so that the ions are not easily dissociated. In the case of the conductive foam layer 14 having a small contact area with the surface of the developing roller 30, cations such that ions are easily dissociated are preferred, and thus diallyl-type ammonium cations that are not polymerized are preferred.

Among diallyl-type ammonium cations, diallyldimethylammonium cations are especially preferred. The diallyldimethylammonium cations have a small molecular mass among diallyl-type ammonium cations, so that the ratio of anions can be relatively increased in combination with anions. Thus, the anion concentration in the diallyldimethylammonium cations is more increased with respect to the same additive mass than the anion concentration in the other diallyl-type ammonium cations, so that the anion mass can be increased with respect to the same additive mass to thus contribute to the improvement in conductivity.

Figure 6:
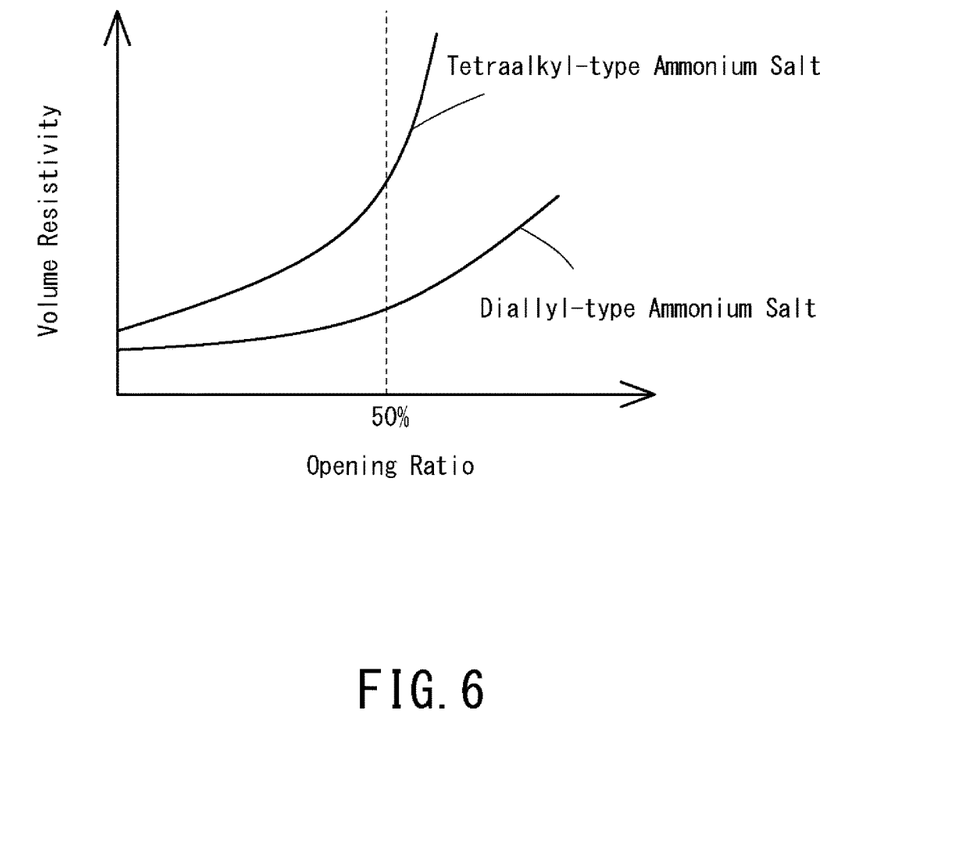
FIG. 6 is a graph showing the relation between a surface opening ratio and a volume resistivity.

The diallyl-type ammonium cations are more easily dissociated than tetraalkylammonium cations (tetraalkyl-type ammonium cations) in which all the groups that are bonded to the N atoms are alkyl groups. Thus, the volume resistivity of the conductive foam roll 10 using the ionic conductive agent containing the diallyl-type ammonium cations has low dependency on the surface opening ratio as shown in FIG. 6. In particular, since the increase in the volume resistivity is small even in the range of 50% or more of the surface opening ratio, the ionic conductive agent containing the diallyl-type ammonium cations is effective as the ionic conductive agent for the conductive foam roll. When an ionic conductive agent containing salt of tetraalkyl ammonium cations is used, the volume resistivity greatly increases from the surface opening ratio of 50% or more, and thus has high dependency on the surface opening ratio as shown in FIG. 6. For this reason, the ionic conductive agent containing salt of tetraalkyl ammonium cations is not easily used as the ionic conductive agent for the conductive foam roll.

The conductive foam layer 14 is made from a foam material such as a polyurethane foam. The material composition of the conductive foam layer 14 does not contain a radical generating agent such as sulfur and a peroxide from the viewpoint of not polymerizing the diallyl-type ammonium cations in the ionic conductive agent.

The material composition of the polyurethane foam consists of a polyol, a polyisocyanate, and an ionic conductive agent. In addition, a foaming agent, a catalyst, a flame retardant agent, a filler, a surface-active agent, or the like may be contained as necessary.

Examples of the polyol of the polyurethane foam include a polyether polyol, a polyester polyol, a polybutadiene polyol, a polyisobutylene polyol, and a polymer polyol containing styrene or acrylic fine particles. Among them, a single kind of polyol may be used alone, or two or more kinds of polyols may be used in combination.

The polyisocyanate of the polyurethane foam is not specifically limited only if defining a polyisocyanate having two or more functional groups. Examples of the polyisocyanate include a 2,4-(or 2,6-) tolylene diisocyanate (TDI), an ortho-toluidine diisocyanate (TODI), a naphthylene diisocyanate (NDI), a xylylene diisocyanate (XDI), a 4,4'-diphenylmethane diisocyanate (MDI), a carbodiimide-modified MDI, a polymethylene polyphenyl isocyanate, a polymeric polyisocyanate, and modified isocyanates and prepolymerized isocyanates. Among them, a single kind of polyisocyanate may be used alone, or two or more kinds of polyisocyanates may be used in combination.

As the foaming agent, a foaming agent commonly used for urethane reaction may be used. Examples of this type of foaming agent include water, a hydrogen atom-containing halogenated hydrocarbon, a low-boiling hydrocarbon, and a liquefied carbon dioxide. Examples of the hydrogen atom-containing halogenated hydrocarbon include a hydrochlorofluorocarbon (HCFC) and a hydrofluorocarbon (HFC). Examples of the low-boiling hydrocarbons include butane, pentane, and a cyclopentane, which have a boiling point of about −5 to 70° C. The content of the foaming agent can be appropriately determined. For example, the content of the foaming agent can be determined to be within the range of 0.1 to 10 parts by mass with respect to 100 parts by mass of the polyol component.

As the catalyst, a catalyst commonly used for polyurethane reaction may be used. Examples of this type of catalyst include amine catalysts and metal catalysts. Examples of the amine catalysts include a triethylene diamine, a pentamethyl diethylene triamine, an N-ethylmorpholine, a diethylethanolamine, an N,N,N',N'-tetramethyl hexamethylenediamine, a 1-isobutyl-2-methylimidazole, a 1,8-diazabicyclo-[5,4,0]-undecene-7, and a bis(dimethylaminoethyl) ether (carboxylate). Examples of the metal catalysts include a stannous octanoate, a dibutylstannic dilaurate, and a lead octylate. Among them, a single kind of catalyst may be used alone, or two or more kinds of catalysts may be used in combination. The content of the catalyst is not limited specifically; however, the content of the catalyst can be determined to be within the range of 0.05 to 5 parts by mass with respect to 100 parts by mass of the polyol component.

The conductive foam layer 14 can be formed by foam molding a material composition in a roll molding die having a mold surface capable of molding the composition into a roll shape. The roll molding die includes a cylindrical die (pipe) having a length almost same as the length of the conductive foam layer 14 in the axial direction, and caps to be attached to and close both the ends of the cylindrical die. By closing both the ends of the cylindrical die with the caps while the shaft body is placed in the cylindrical die so as to be coaxial with the cylindrical die, and clamping the die, the shaft body is supported so as to be coaxial with the cylindrical die by the caps, whereby a molding cavity to give an intended roll shape to a conductive foam layer is formed in the cylindrical die. The material composition is poured into the molding cavity, and foamed to be cured, whereby the conductive foam layer 14 is integrally molded around the shaft body 12, and is then removed from the die.

When the mold surface of the roll molding die is made of a fluorine resin, or a coating layer made of a fluorine resin is formed on the mold surface, the mold surface has water repellency. Thus, the formed conductive foam layer 14 has a configuration that the cells 16a close to the surface are easily open to the surface of the conductive foam layer 14, whereby the recesses 20 are easily formed directly.

Figure 7A:
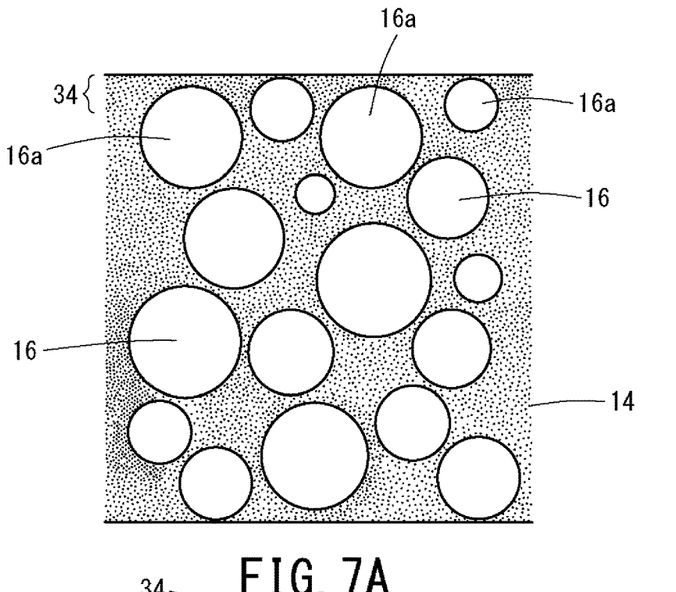
FIGS. 7A and 7B are process charts for explaining a method for opening cells in a portion close to a surface of a conductive foam layer by removing a skin layer.
Figure 7B:
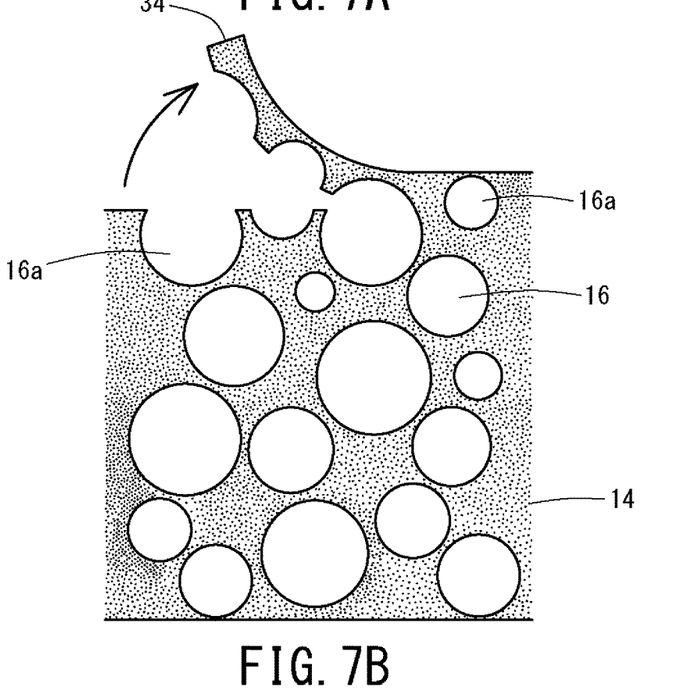

When the cells 16a close to the surface are not open to the surface of the conductive foam layer 14 after the molding, the cells 16a close to the surface can be opened to the surface of conductive foam layer 14 by breaking a thin-film skin layer that covers the cell 16a near the surface. For example, as shown in FIGS. 7A and 7B, the thin-film skin layer 34 that covers the cells 16a close to the surface may be broken by pulling up a thin-film skin layer 34 that covers the cells 16a close to the surface to peel off the skin layer 34 from the surface of the conductive foam layer 14. Alternatively, the thin-film skin layer 34 that covers the cells 16a close to the surface may be broken by creating holes in the thin-film skin layer 34 that covers the cells 16a close to the surface with the use of a pointed jig.

The conductive foam layer 14 may be formed by being cut into a roll shape from a block-shaped foamed body that is made by slab foaming or mold foaming the material composition. In this case, the surface of the roll body that is cut into a roll shape needs to be polished in order to have a predetermined dimension. The surface of the roll body is fluffed by the polishing, so that a treatment to remove the fluff is required.

In this manner, the surface opening ratio of the conductive foam layer 14 can be adjusted by the foaming ratio, by selecting a mold release agent that is applied to the roll molding die from silicone, fluorine, and polyethylene, by peeling off the skin layer 34, by creating holes in the skin layer 34, by polishing, or the like.

Examples of the shaft body 12 include metals such as iron, stainless steel, aluminum, and plated iron, and plastic such as polyacetal (POM), an acrylonitrile-butadiene-styrene copolymer (ABS), polycarbonate, and polyamide. In addition, the outer circumference of the shaft body 12 may be coated with an adhesive agent or a primer as necessary.

EXAMPLE

A description of the present invention will now be specifically provided; however, the present invention is not limited thereto.

Examples 1 to 3

Preparation of Compositions for a Conductive Foam Layer

Each polyol blended liquid was prepared by mixing 100 parts by mass of a polyether polyol ("FA703" manufactured by SANYO CHEMICAL INDUSTRIES, LTD., containing 10% of EO, OH value=33), 1.0 part by mass of a silicone-based foam stabilizer ("SRX274DL" manufactured by DOW CORNING TORAY CO., LTD.), 1.7 parts by mass of distilled water (a foaming agent), 0.2 parts by mass of a catalyst (triethylenediamine, "TEDA L33" manufactured by Tosoh Corporation), 0.05 parts by mass of a catalyst (a bis(dimethylaminoethyl) ether, "TOYOCAT ET" manufactured by TOSOH CORPORATION), and 1.0 part by mass of an ionic conductive agent B.

Each isocyanate mixed liquid was prepared by mixing 15.2 parts by mass of isocyanate (TDI, "CORONATE T80" manufactured by NIPPON POLYURETHANE INDUSTRY CO., LTD., NCO 48%), and 10.1 parts by mass of isocyanate (crude-MDI, "Millionate MR200" manufactured by NIPPON POLYURETHANE INDUSTRY CO., LTD., NCO 31%).

Compositions for a conductive foam layer were prepared by mixing the polyol blended liquids and the isocyanate mixed liquids.

Production of Conductive Foam Rolls

Each conductive foam roll was produced in which a polyurethane conductive foam layer was integrally molded around a shaft body. Each shaft body having a solid cylindrical shape was placed in a pipe die on which a hydrophilic silicone mold release agent was applied in a roll molding die so as to be coaxial with the roll molding die, and both the ends of the pipe die were closed with caps to support the shaft body. In this state, each composition for the conductive foam layer was poured into a molding cavity, and foamed to be cured under the condition of 90° C.×30 minutes so as to have a foam density of 0.11 (g/cm³). Skin layers formed on the roll surfaces were polished. In this manner, the conductive foam rolls (13.2 mm in diameter) having surface opening ratios of 72%, 50%, and 90% were produced.

Example 4

A conductive foam roll having a surface opening ratio of 70% was produced in the same manner as in Examples 1 to 3, except that an ionic conductive agent A was used instead of the ionic conductive agent B in preparation of the composition for a conductive foam layer.

Comparative Example 1

A conductive foam roll having a surface opening ratio of 70% was produced in the same manner as in Example 1, except that 0.3 parts by mass of a peroxide ("PERBUTYL ND" manufactured by NOF CORPORATION) was further added to the polyol blended liquid in preparation of the composition for a conductive foam layer.

Comparative Example 2

A conductive foam roll was produced in the same manner as in Example 1, except that the conductive foam roll has a surface opening ratio of 40%.

Comparative Example 3

A conductive foam roll having a surface opening ratio of 70% was produced in the same manner as in Example 1, except that an ionic conductive agent C was used instead of the ionic conductive agent B in preparation of the composition for a conductive foam layer.

Comparative Example 4

A conductive foam roll having a surface opening ratio of 70% was produced in the same manner as in Example 1, except that an ionic conductive agent D was used instead of the ionic conductive agent B in preparation of the composition for a conductive foam layer.

The configurations of the ionic conductive agents A to D are shown in Table 2.

TABLE 2

| Structure | Ion conductive agent A | Ion conductive agent B | Ion conductive agent C | Ion conductive agent D |
|---|---|---|---|---|
| Cation |  Diallyldimethyl-ammonium |  Diallyldimethyl-ammonium |  |  Diallyldimethyl-ammonium |
| Anion |  TFSI |  FSI |  TFSI |  TF |

Measurement of surface opening ratios, measurement of volume resistivities, evaluation of cleaning performance, and evaluation of surface opening ratio dependency of the volume resistivities were carried out on thus-produced conductive foam rolls. Measurement methods, evaluation methods, and evaluation criteria are as follows. The results are shown in Table 3 along with compositions.

Measurement of Surface Opening Ratios

A surface image of a predetermined range (3.2 mm×2.4 mm) of each conductive foam layer was picked up with the use of an optical microscope, on which digitized image analysis was performed. Then, the surface opening ratio of each conductive foam layer was found based on the following equation.

Surface aperture ratio (%)=Opening area/Image range×100

Measurement of Volume Resistivities

Each conductive foam roll was brought into line contact with a metal rod under the NN environment (23° C., 50% RH), and each metal rod was rotationally driven while a load of 300 g was imposed on each ends of each shaft body. Each conductive foam roll was corotated at 30 rpm, and the electrical resistance between each shaft body and each metal rod was measured while applying a DC voltage of 200 V from the end of each shaft body (for 1 minute). Thus, volume resistivities (Ω·cm) of the conductive foam rolls were found.

Evaluation of Cleaning Performance

Each conductive foam roll was attached to a commercially available printer ("IPSIO CX3000" manufactured by RICOH CO., LTD.) as a toner supply roll to print a solid image under the LL environment (15° C., 10% RH), and the images were examined for shade variations in the printing. The images where shading variations in the printing were observed were rated as "Poor", and the images where no shading variations in the printing were observed were rated as "Good".

Evaluation of Surface Opening Ratio Dependency of the volume Resistivities

Figure 8:
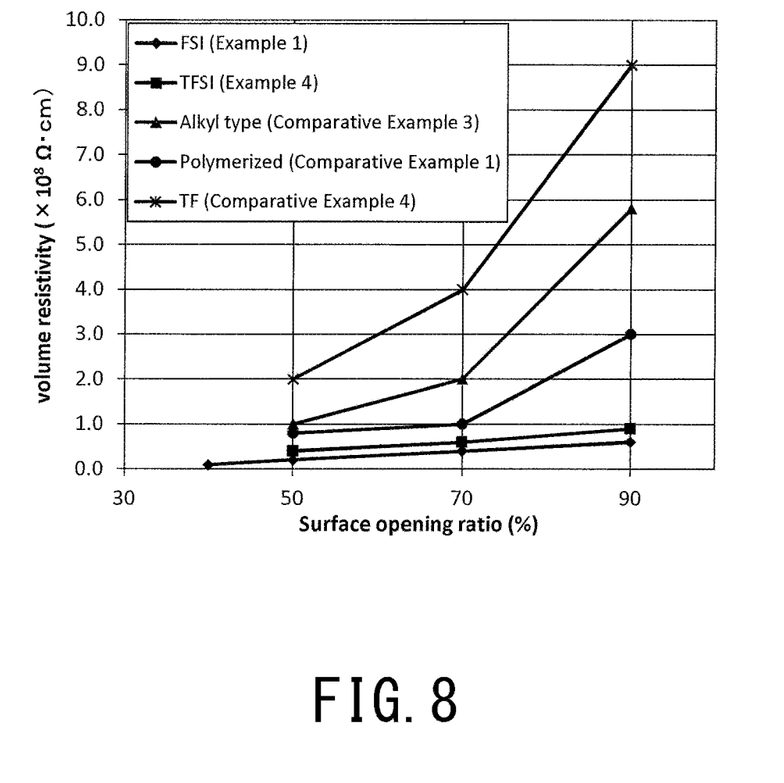
FIG. 8 is a graph showing the relations between surface opening ratios and volume resistivities according to examples and comparative examples.

Concerning the conductive foam rolls according to Examples 1 to 3 and Comparative Example 2, volume resistivities of the conductive foam rolls having surface opening ratios of 50% and 90% were found based on the volume resistivities of the conductive foam rolls according to Examples 2 and 3. Concerning the conductive foam rolls according to Examples 4, and Comparative Examples 1, 3, and 4, conductive foam rolls having a surface opening ratio of 50% were produced in accordance with the conductive foam rolls according to Examples 4, and Comparative Examples 1, 3, and 4, and volume resistivities of the conductive foam rolls according to Examples 4, and Comparative Examples 1, 3, and 4 were measured. Then, the surfaces of the conductive foam layers were polished to increase the surface opening ratios to be adjusted to be 90%. Volume resistivities of thus-produced conductive foam rolls having surface opening ratios of 50% and 90% were measured. The surface opening ratio dependency of the volume resistivities was evaluated based on the ratio between the volume resistivity of the conductive foam roll having a surface opening ratio of 50% and the volume resistivity of the conductive foam roll having a surface opening ratio of 90%, and based on FIG. 8. FIG. 8 is a graph showing the relations between the surface opening ratios and volume resistivities according to examples and comparative examples.

TABLE 3

| | | Example | | | |
|---|---|---|---|---|---|
| | | 1 | 2 | 3 | 4 |
| | Type of Anion | FSI | FSI | FSI | TFSI |
| | Type of Cation | DADMA Not Polymerized | DADMA Not Polymerized | DADMA Not Polymerized | DADMA Not Polymerized |
| Composition | Polyether Polyol (Ohv = 33) | 100 | 100 | 100 | 100 |
| | Silicone-Based Foam Stabilizer | 1.0 | 1.0 | 1.0 | 1.0 |
| | Foaming Agent (Distilled Water) (Ohv = 6233) | 1.7 | 1.7 | 1.7 | 1.7 |
| | Ion Conductive Agent A | — | — | — | 1.0 |
| | Ion Conductive Agent B | 1.0 | 1.0 | 1.0 | — |
| | Ion Conductive Agent C | — | — | — | — |
| | Ion Conductive Agent D | — | — | — | — |
| | Catalyst (TEDA) | 0.2 | 0.2 | 0.2 | 0.2 |
| | Catalyst (TOYOCAT ET) | 0.05 | 0.05 | 0.05 | 0.05 |
| | Isocyanate (TDI) | 15.2 | 15.2 | 15.2 | 15.2 |
| | Isocyanate (c-MDI) | 10.1 | 10.1 | 10.1 | 10.1 |
| | Peroxide | — | — | — | — |
| | Ohv | 134 | 134 | 134 | 134 |
| | NCO % | 41.2 | 41.2 | 41.2 | 41.2 |
| | NCO/OH-Index | 100 | 100 | 100 | 100 |
| Evaluation | Surface Opening Ratio (%) | 72 | 50 | 90 | 70 |
| | Cleaning Performance | Good | Good | Very Good | Good |
| | Volume Resistivity Value ($\Omega \cdot$ cm) | $4.0 \times 10^7$ | $2.0 \times 10^7$ | $6.0 \times 10^7$ | $6.0 \times 10^7$ |
| | Evaluation | Very Good | Very Good | Good | Good |
| | Opening Ratio of 50% | $2.0 \times 10^7$ | $2.0 \times 10^7$ | $2.0 \times 10^7$ | $4.0 \times 10^7$ |
| | Opening Ratio of 90% | $6.0 \times 10^7$ | $6.0 \times 10^7$ | $6.0 \times 10^7$ | $9.0 \times 10^7$ |
| | Ratio between Opening Ratios of 90%/ and 50% | | 3.0 | | 2.3 |
| | Opening Ratio Dependency | | Good | | Good |

| | | Comparative Example | | | |
|---|---|---|---|---|---|
| | | 1 | 2 | 3 | 4 |
| | Type of Anion | FSI | FSI | TFSI | TF |
| | Type of Cation | DADMA Polymerized | DADMA Not Polymerized | TMOA — | DADMA Not Polymerized |
| Composition | Polyether Polyol (Ohv = 33) | 100 | 100 | 100 | 100 |
| | Silicone-Based Foam Stabilizer | 1.0 | 1.0 | 1.0 | 1.0 |
| | Foaming Agent (Distilled Water) (Ohv = 6233) | 1.7 | 1.7 | 1.7 | 1.7 |
| | Ion Conductive Agent A | — | — | — | — |
| | Ion Conductive Agent B | 1.0 | 1.0 | — | — |
| | Ion Conductive Agent C | — | — | 1.0 | — |
| | Ion Conductive Agent D | — | — | — | 1.0 |
| | Catalyst (TEDA) | 0.2 | 0.2 | 0.2 | 0.2 |
| | Catalyst (TOYOCAT ET) | 0.05 | 0.05 | 0.05 | 0.05 |
| | Isocyanate (TDI) | 15.2 | 15.2 | 15.2 | 15.2 |
| | Isocyanate (c-MDI) | 10.1 | 10.1 | 10.1 | 10.1 |

TABLE 3-continued

|  |  |  |  |  |  |
|---|---|---|---|---|---|
|  | Peroxide | 0.3 | — | — | — |
|  | Ohv | 134 | 134 | 134 | 134 |
|  | NCO % | 41.2 | 41.2 | 41.2 | 41.2 |
|  | NCO/OH-Index | 100 | 100 | 100 | 100 |
| Evaluation | Surface Opening Ratio (%) | 70 | 40 | 70 | 70 |
|  | Cleaning Performance | Good | Poor | Good | Good |
|  | Volume Resistivity Value ($\Omega \cdot cm$) | $1.0 \times 10^8$ | $9.0 \times 10^6$ | $2.0 \times 10^8$ | $4.0 \times 10^8$ |
|  | Evaluation | Poor | Very Good | Poor | Poor |
|  | Opening Ratio of 50% | $8.0 \times 10^7$ | $2.0 \times 10^7$ | $1.0 \times 10^8$ | $2.0 \times 10^8$ |
|  | Opening Ratio of 90% | $3.0 \times 10^8$ | $6.0 \times 10^7$ | $5.8 \times 10^8$ | $9.0 \times 10^3$ |
|  | Ratio between Opening Ratios of 90%/ and 50% | 3.8 | 3.0 | 5.8 | 4.5 |
|  | Opening Ratio Dependency | Good | Good | Poor | Poor |

FSI: N,N-bis (fluorosulfonyl) Imide
TFSI: N,N-bis(trifluoromethanesulfonyl) Imide
DADMA: Diallyldimethylammonium
TMOA: Trimethyloctylammonium
TF: Trifluoromethanesulfonate In the conductive foam roll according to Comparative Example 1, the cations in the ionic conductive agent are polymerized. For this reason, the conductive foam roll according to Comparative Example 1 has a slightly higher resistivity even when having a surface opening ratio of 50%. When the surface opening ratio exceeds 70%, the low resistance required for the conductive foam roll is not satisfied anymore. In addition, the conductive foam roll according to Comparative Example 1 has high surface opening ratio dependency of the resistivity as shown in FIG. 8, so that the ionic conductive agent is not suitable for an ionic conductive agent used in a conductive foam roll. In the conductive foam roll according to Comparative Example 2, the surface opening ratio is 40%. For this reason, the cleaning performance is not satisfied. In the conductive foam roll according to Comparative Example 3, the cations in the ionic conductive agent define tetraalkylammonium cations. For this reason, the conductive foam roll according to Comparative Example 3 has a higher resistivity even when having a surface opening ratio of 50%, and does not satisfy the low resistance required for the conductive foam roll. In addition, the conductive foam roll according to Comparative Example 3 has high surface opening ratio dependency of the resistivity as shown in FIG. 8, so that the ionic conductive agent is not suitable for an ionic conductive agent used in a conductive foam roll. In the conductive foam roll according to Comparative Example 4, the anions in the ionic conductive agent are made from TF having a low molecular mass. For this reason, the conductive foam roll according to Comparative Example 4 has a higher resistivity even when having a surface opening ratio of 50%, and does not satisfy the low resistance required for the conductive foam roll. In addition, the conductive foam roll according to Comparative Example 4 has high surface opening ratio dependency of the resistivity as shown in FIG. 8, so that the ionic conductive agent is not suitable for an ionic conductive agent used in a conductive foam roll.

Meanwhile, in the conductive foam rolls according to Examples 1 to 4, the anions in the ionic conductive agents define FSI or TFSI, and the cations in the ionic conductive agents define diallyl-type ammonium cations. For this reason, the conductive foam rolls according to Examples 1 to 4 have sufficiently low resistivities in the range of 50% to 90% of the surface opening ratio, and satisfy the low resistance required for the conductive foam roll. In addition, the conductive foam rolls according to Examples 1 to 4 have low surface opening ratio dependency of the resistivities as shown in FIG. 8, so that the ionic conductive agents are found to be suitable for an ionic conductive agent used in a conductive foam roll. Among the conductive foam rolls according to Examples 1 to 4, the conductive foam rolls according to Examples 1 to 3 in which the anions in the ionic conductive agents define FSI have lower resistivities in the entire range of 50% to 90% of the surface opening ratio, and are thus found to be more excellent in conductivity.

While the embodiment of the present invention has been described in detail, the present invention is not limited to the above-described embodiment, and various modifications can be made without departing from the gist of the present invention.

The invention claimed is:

1. A conductive foam roll comprising:
a shaft body; and
a conductive foam layer around the shaft body,
wherein the conductive foam layer has a surface opening ratio of 50% to 90%, and
wherein the conductive foam layer comprises an ionic conductive agent, and the ionic conductive agent comprises salt of non-polymerized diallyl dialkyl ammonium cations wherein both of the alkyl groups have 1 to 8 carbon atoms, and at least one member selected from the group consisting of N,N-bis(trifluoromethanesulfonyl)imide anions, and N,N-bis(fluorosulfonyl) imide anions.

2. The conductive foam roll according to claim 1,
wherein the anions in the ionic conductive agent comprise N,N-bis(fluorosulfonyl)imide anions.

3. The conductive foam roll according to claim 2,
wherein the cations in the ionic conductive agent comprise diallyldimethylammonium cations.

4. The conductive foam roll according to claim 3,
wherein the opening ratio is within the range of 60% to 80%.

5. The conductive foam roll according to claim 4,
wherein the conductive foam layer has an average opening diameter of 50 to 500 μm in the surface thereof.

6. The conductive foam roll according to claim 3,
wherein the conductive foam layer has an average opening diameter of 50 to 500 μm in the surface thereof.

7. The conductive foam roll according to claim 1,
wherein the cations in the ionic conductive agent comprise diallyldimethylammonium cations.

8. The conductive foam roll according to claim 1,
wherein the opening ratio is within the range of 60% to 80%.

9. The conductive foam roll according to claim 1, wherein the conductive foam layer has an average opening diameter of 50 to 500 μm in the surface thereof.

* * * * *